United States Patent [19]

Lindberg

[11] 4,032,027
[45] June 28, 1977

[54] AUTOMATIC TRAY LOADING DEVICE

[76] Inventor: Gunnar V. Lindberg, Vallingbyvagen 212, 162 21 Vallingby, Sweden

[22] Filed: Aug. 18, 1975

[21] Appl. No.: 605,230

[52] U.S. Cl. .......................... 214/16.6; 214/16.4 C; 214/41 R
[51] Int. Cl.² ....................................... B65G 47/00
[58] Field of Search ............ 214/41 R, 16.6, 16.4 C

[56] References Cited
UNITED STATES PATENTS

| | | | |
|---|---|---|---|
| 2,718,972 | 9/1955 | Temple | 214/16.6 |
| 3,068,987 | 12/1962 | Franklin | 214/16.6 |
| 3,372,217 | 3/1968 | Paerels et al. | 214/16.6 |

Primary Examiner—Trygve M. Blix
Assistant Examiner—Charles E. Frankfort
Attorney, Agent, or Firm—Strauch, Nolan, Neale, Nies & Kurz

[57] ABSTRACT

Apparatus for transferring trays, which contain prepared material such as food, and progress along a conveyor at a horizontal level to a transfer station, from that transfer station to a multi-level tray compartment of a transport van. The apparatus includes a multi-level tray magazine located adjacent intermediate the transfer station and transport van loading location and is shiftable vertically in steps equal in distance to the vertical distance between tray levels. A single horizontal reciprocating tranfer pusher shifts individual trays from the transfer station into the magazine as it vertically shifts in steps. Two laterally reciprocating loader units, one vertically above the other and on upper and lower side of the tray transfer pusher can engage and slide a plural number of trays from the magazine into the loader. The levels of magazine tray racks is one more than the plural number of trays which can be engaged and slid from the magazine by each of the loader units. The loader units can laterally reciprocate a selectively variable distance to accommodate shifting the trays a greater distance into the tray levels in a transport van.

4 Claims, 2 Drawing Figures

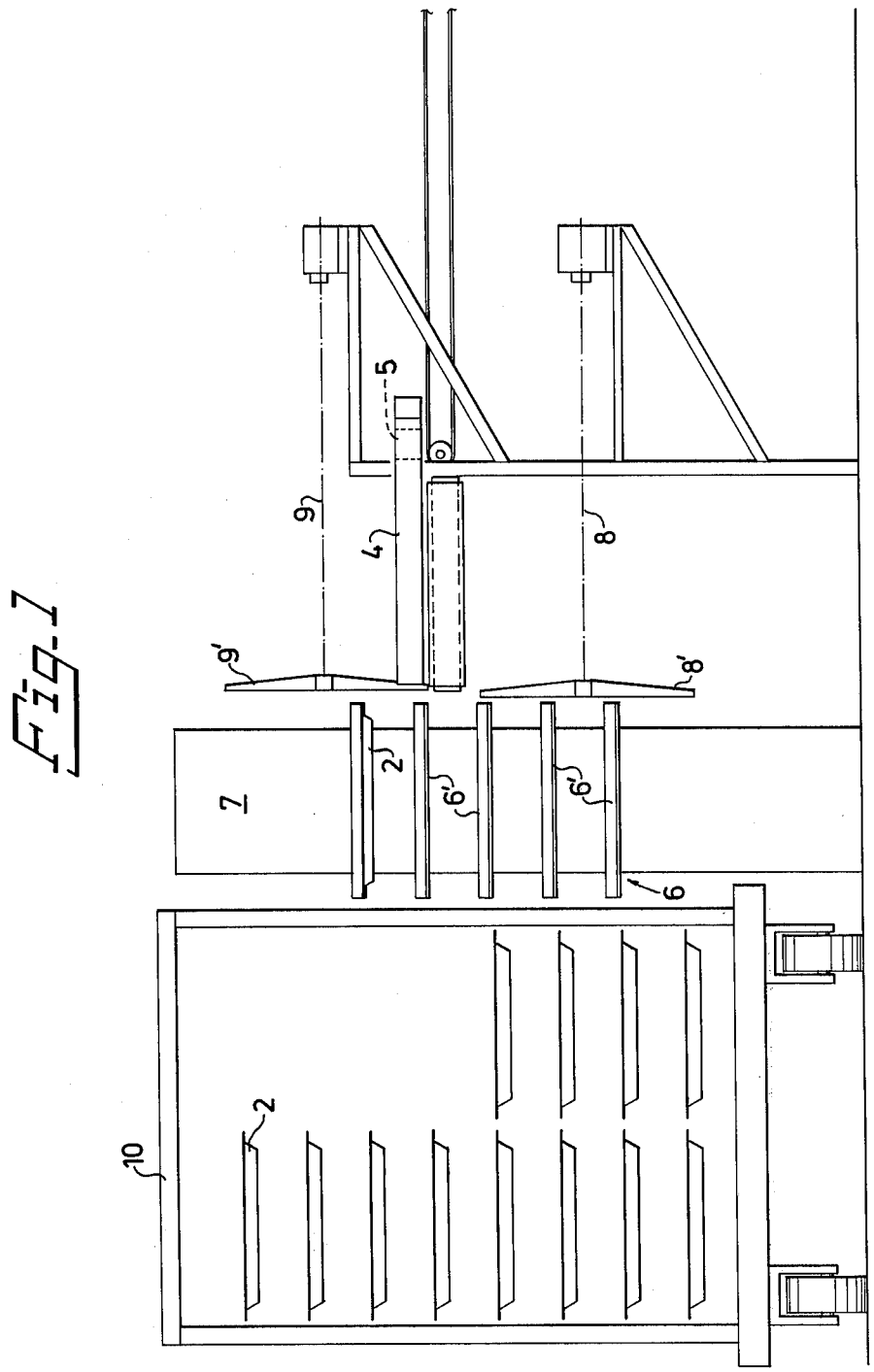

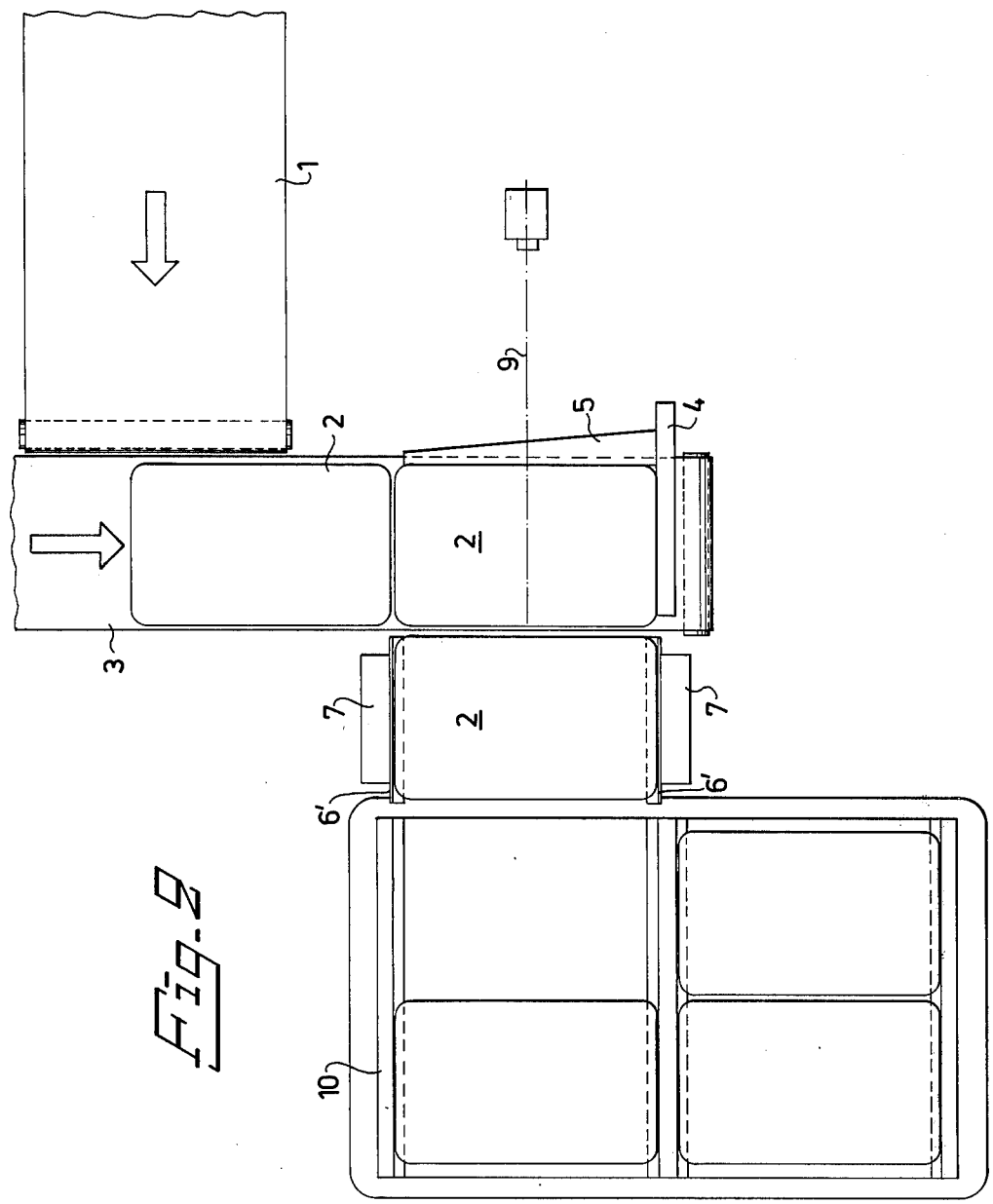

AUTOMATIC TRAY LOADING DEVICE

The present invention relates to an automatic tray loading device transporting ready spread trays from a transport means, such as a conveyor belt, to a tray transport van. The device according to the invention may be used for for example trays with food for hospital patients or baking-plates in a bakery or the like.

It is an object of the present invention to provide an automatic tray loading device which can be easily used together with conventional tray transport vans and which has a simple construction, a reliable function and a high operating speed.

The present invention relates to an automatic tray loading device for transferring trays, baking-plates or the like from a conveying means to a tray transport van, and comprising at least one magazine formed by a number of pairs of horizontal guiding means for receiving trays, said pairs of guiding means being spaced above each other and forming a unit, said magazine being guided along vertical guide means on said pillars and movable upwards and downwards one or several steps, each of said steps being equal to the distance between two pairs of guiding means, that said magazine has an input side for trays close to a conveying means, preferably a conveyor belt, a magazine loader being located close to said input side, and loading means preferably pneumatically or hydraulically driven or driven by a step motor for transferring a number of trays out of the magazine and to the tray transport van, characterized by the fact that a first loader is located under the magazine loader and that a second loader is located above the magazine loader, said loaders being arranged to operate alternatingly.

The invention is illustrated by an embodiment shown as an example in the attached drawings. Some details are only shown schematically.

FIG. 1 is a side view of a tray loading device according to the invention and a schematically shown tray transport van.

FIG. 2 shows the tray loading device as seen from above.

The construction of the tray loading device according to the invention will be explained below together with a description of the function of the device. A conveyor 1 in the form of an endless belt is arranged to convey ready spread trays 2. A second conveyor 3, also in the form of an endless belt, is located adjacent to said first conveyor 1 and is arranged to feed the trays to a stop 4 with a magazine loader 5 displaceable to and fro across said second conveyor 3. By said magazine loader 5 a tray 2 fed to the stop 4 can be displaced into a magazine 6. Said magazine 6 is formed by a number, for example 5 as in FIG. 1, of pairs of horizontal guiding means 6', said pairs being equally spaced above each other and kept together to a unit. The magazine 6 is vertically movably supported at or between a pair of vertical side pillars 7, which are provided with vertical guiding means (not shown) in which the magazine is guided. The magazine is vertically driveable by a step motor driven chain driving device (not shown), a ball screw or the like. By said driving device one pair of guiding means 6' after the other will be located in level with the second conveyor 3 to receive a tray 2 transferred from said second conveyor 3 by the magazine loader 5.

The vertical distances between the pairs of guiding means 6' is equal to the vertical distances between tray receiving rails or the like in a tray transport van 10 for a number of trays, for example 32 as in the van shown in the drawings. The second conveyor 3 is substantially in level with one of the pairs of rails or the like in the van 10.

A first loader 8 is located at the input side of the magazine 6 below the second conveyor 3 and the magazine loader 5, said first loader 8 being driven preferably hydraulically, pneumatically or by a step motor and a ball screw. A second loader 9 is located above the second conveyor 3 and is driven in the same way as the first loader 8. The pusher means (8',9') of the loaders 8,9 have such a vertical extension that they can abut and each simultaneously displace for example four trays 2 out of the magazine 6 and over to the tray transport van 10. Said pusher means 8',9' have such an operation area, that they can displace the trays to a left or right position in the tray transport van 10 as seen in the drawings and as will be closer explained below.

When the loading of an empty tray transport van 10 begins, the magazine 6 is in its upper position on the side pillars 7, whereby the lowermost pair of guiding means is in level with the second conveyor 3. By the magazine loader 5 a tray 2 transported on the second conveyor 3 to the stop 4 can be displaced on to said pair of guiding means 6'. The feeding means 9' of the second loader 9 will be moved, for example swung, out of the way of said tray displacement. Thereafter the magazine 6 is moved downwards a distance equal to the distance between two pairs of guiding means and the next pair of guiding means will receive a tray and so on, until four pairs of guiding means have received a tray each. Now the magazine has reached and stopped in its lowermost position. Thereafter the first loader 8 will transfer the four trays out of the magazine and into the tray transport van 10 into the leftmost position in FIG. 1. Thereafter the first loader 8 will return to its initial position. At the same time as the loader 8 operates, the magazine loader 5 will transfer a tray to the fifth, upper pair of guiding means.

Thereafter the magazine 6 will be lifted a distance equal to the distance between two pairs of guiding means at a time and filled with trays. The second loader 9 will thereafter displace the four upper trays out of the magazine and into the tray transport van in the leftmost position in FIG. 1. Thereafter the second loader 9 will return to its initial position. The tray on the lowermost pair of guiding means has remained thereon. The three pairs of guiding means above the lowermost pair in the magazine, said lowermost pair already having received a tray, will now receive a tray each under the stepwise movement of the magazine 6 to its lowermost position. The first loader 8 will now transfer four trays into the van 10 in the rightmost position in FIG. 1, at the same time as the uppermost pair of guiding means is provided with a tray. The first loader 8, as well as the second loader 9, thus have two different displacement lengths for displacing groups of trays and thus providing the two vertical columns of trays in the van.

After a vertical portion or column of the van 10 has been filled with trays, the van and possible sliding doors thereof will be moved, so that the next portion or column will be located at the magazine 6 and filled with trays in the manner described above. During the movement of the van the sinking magazine 6 can be filled in order to save time. If the side of the van 10 can be made free by doors that can be swung up for example the tray loader can have double magazines, that is two magazines united to each other, whereby trays can be simultaneously fed into two vertical portions in the van. Also the magazine loader will be extended to feed two trays at a time, and each of the loaders 8,9 will simultaneously transfer trays out of both magazines.

As compared to the tray transport van, which has two even numbers of pairs of rails or the like, the magazine should have a number of pairs of guiding means equal to half the number of rails or the like in a vertical column of the van plus one, that is if the van has for example 12 pairs of rails or the like per column, the magazine should have 7 pairs of guiding means, and the loaders can transfer 6 trays at a time into the van.

The movements described above can be completely automatically controlled by conventional control devices and depending on the tray transport van taking the correct position at the tray loader and its magazine. It is not necessary that the loaders 8,9 operate alternatingly. Instead each loader may operate twice at a time, whereby the movement pattern of the magazine will be different from the one described above.

The tray loading device according to the invention has the advantage of being easily adjustable to conventional tray transport vans. The whole operation including transferring trays from the tray transport conveyor and over to the tray transport van can take place at a high speed, especially as a pair of guiding means of the magazine can receive a tray simultaneously as trays are removed from other pairs of guiding means of the magazine.

The invention is not restricted to the embodiment described and shown in the drawings, as this can be modified within the scope of the invention. For example the second conveyor can be deleted and the first conveyor can take its place. The second conveyor may be replaced by a transport plane or table. The loaders may have only one length of displacement, if they are arranged to load vans having only one vertical column of trays. The shape of the various details of the tray loader may be varied.

What I claim is:

1. An automatic tray loading apparatus for use in combination with a single level tray conveying means to transfer trays from the conveying means to a tray transport van which has a plurality of vertically spaced tray receiving racks said conveying means conveying trays along a single horizontal path to a transfer station, said loading apparatus comprising: a vertically movable magazine unit including a number of pairs of horizontal guiding means each being capable of receiving at least one tray, said pairs being spaced one above the other and together constituting a unit; side pillars along which said magazine unit is vertically guided; means for moving said magazine unit upwards and downwards in steps, each step being equal to the vertical distance between adjacent pairs of tray guiding means; one side of said magazine unit being a tray input side between said pillars and said input side being disposed adjacent said transfer station at the side of and parallel with the tray conveying means; a magazine loader at said transfer station disposed adjacent said magazine input side and adapted to laterally reciprocate and engage and shift at least one tray sideways from the conveying means onto an adjacent pair of horizontal guiding means; loading means for horizontally shifting vertically carried trays from said magazine unit to the tray transport van comprising, a first loader device located under the magazine loader and adjacent said magazine input side and a second loader device located above both the first loader device and the magazine loader and adjacent said magazine input side, each loader device being powdered by a step motor means and the two loader devices being alternately operable to shift trays, each loader device having tray shifting structure adapted to simultaneously engage and laterally shift the trays from a plurality number of pairs of said horizontal guiding means.

2. An automatic tray loading apparatus as defined in claim 1, wherein the tray transport van to be loaded will have a plurality of vertically spaced tray receiving racks equal in number to an even value $n$; the number of pairs of horizontal guiding means on said magazine being equal to $\frac{1}{2}n + 1$; and each loader device tray shifting structure constructed to simultaneously engage and laterally shift the trays from a plurality number of pairs of said horizontal guiding means equal to $\frac{1}{2}n$.

3. A tray loading apparatus as defined in claim 1, wherein said step motor means laterally reciprocates said loader devices tray shifting structures a distance sufficient to shift said trays fully from said magazine into the van.

4. A tray loading apparatus as defined in claim 3, wherein said step motor means are selectively variable to extend the reciprocation stroke to a second distance greater than said first mentioned distance by an amount at least equal to the lateral dimension of a tray being shifted.

* * * * *